(12) United States Patent
Kanamori et al.

(10) Patent No.: US 9,716,260 B2
(45) Date of Patent: Jul. 25, 2017

(54) BATTERY CASE

(71) Applicants: SOODE NAGANO CO., LTD., Nagano (JP); NIPPON LIGHT METAL COMPANY, LTD., Tokyo (JP); NIKKEIKIN ALUMINIUM CORE TECHNOLOGY COMPANY LTD., Tokyo (JP)

(72) Inventors: Keiji Kanamori, Tokyo (JP); Shinichi Nomura, Tokyo (JP); Yoshihiko Moriyama, Tokyo (JP); Takayuki Sode, Nagano (JP); Yukinori Sugiyama, Nagano (JP)

(73) Assignees: SOODE NAGANO CO., LTD., Nagano (JP); NIPPON LIGHT METAL COMPANY, LTD., Tokyo (JP); NIKKEIKIN ALUMINIUM CORE TECHNOLOGY COMPANY LTD., Tokyo (JP)

( * ) Notice: Subject to any disclaimer, the term of this patent is extended or adjusted under 35 U.S.C. 154(b) by 114 days.

(21) Appl. No.: 14/783,044

(22) PCT Filed: Mar. 27, 2014

(86) PCT No.: PCT/JP2014/059012
§ 371 (c)(1),
(2) Date: Oct. 7, 2015

(87) PCT Pub. No.: WO2014/171293
PCT Pub. Date: Oct. 23, 2014

(65) Prior Publication Data
US 2016/0028057 A1    Jan. 28, 2016

(30) Foreign Application Priority Data
Apr. 16, 2013 (JP) ................. 2013-085906

(51) Int. Cl.
*H01M 2/12* (2006.01)
*H01M 2/04* (2006.01)
(Continued)

(52) U.S. Cl.
CPC ....... *H01M 2/1241* (2013.01); *H01M 2/0473* (2013.01); *H01M 10/0525* (2013.01);
(Continued)

(58) Field of Classification Search
CPC combination set(s) only.
See application file for complete search history.

(56) References Cited

U.S. PATENT DOCUMENTS 6,296,965 B1 * 10/2001 Azema .................... H01M 2/34
429/57
6,521,024 B1 * 2/2003 Akahori .............. H01M 2/1241
96/12
(Continued)

FOREIGN PATENT DOCUMENTS

JP    H11-273640 A    10/1999
JP    2003-187774 A    7/2003
(Continued)

OTHER PUBLICATIONS

European Patent Office, Extended European Search Report for EP patent application No. 14785605.8, Oct. 28, 2016.
International Search Report for PCT/JP2014/059012, May 13, 2014.

*Primary Examiner* — Kaity Chandler

(57) ABSTRACT

A battery case provided with a safety valve (4) in which a breakage groove (45) is used, wherein in order to stabilize the operation pressure, a lid (2) of the battery case has formed thereon: a thin plate portion (30) obtained by thinning a plate part (3); and a first recessed part (40) comprising a curved part (44) in which the thin plate portion (30) is indented inward, with respect to the case, in a curved shape. The breakage groove (45) for the safety valve (4) is formed (Continued)

at the bottom part (440) of the curved part (44). A first connecting portion (46) and a second connecting portion (47) of the plate part (3), which connect to the curved part (44) on both sides flanking the curved part (44), are at positions protruding toward the outside of the case from the plate part (3).

11 Claims, 11 Drawing Sheets

(51) Int. Cl.
  *H01M 10/0525* (2010.01)
  *H01M 10/058* (2010.01)
(52) U.S. Cl.
  CPC ........ *H01M 2/0486* (2013.01); *H01M 10/058* (2013.01); *H01M 2200/20* (2013.01)

(56) References Cited

U.S. PATENT DOCUMENTS

| | | | | |
|---|---|---|---|---|
| 6,632,559 B1 * | 10/2003 | Kawamura | ......... | H01M 2/1241 |
| | | | | 429/56 |
| 7,927,727 B2 * | 4/2011 | Kim | .................... | H01M 2/1241 |
| | | | | 429/163 |
| 9,196,895 B2 * | 11/2015 | Harada | ................ | H01M 2/345 |
| 2003/0131880 A1 | 7/2003 | Marubayashi et al. | | |
| 2005/0277017 A1 * | 12/2005 | Cho | .................... | H01M 2/1241 |
| | | | | 429/56 |
| 2006/0063063 A1 * | 3/2006 | Mori | ................ | H01M 2/1252 |
| | | | | 429/53 |
| 2011/0212350 A1 | 9/2011 | Sato et al. | | |
| 2011/0236734 A1 * | 9/2011 | Ikeda | .................. | H01M 2/1241 |
| | | | | 429/56 |
| 2011/0311847 A1 | 12/2011 | Tanaka et al. | | |
| 2013/0196188 A1 | 8/2013 | Sode et al. | | |
| 2013/0224536 A1 * | 8/2013 | Hattori | ................... | H01M 2/30 |
| | | | | 429/61 |
| 2013/0252037 A1 * | 9/2013 | Chiba | ................ | H01M 2/1241 |
| | | | | 429/53 |

FOREIGN PATENT DOCUMENTS

| | | |
|---|---|---|
| JP | 2009-004271 A | 1/2009 |
| JP | 2011-192550 A | 9/2011 |
| JP | 2012-252809 A | 12/2012 |
| WO | 2012/049907 A1 | 4/2012 |

* cited by examiner (a)

(b)

(c)

(a)

(b)

(c)

(d)

(e)

(f)

(g)

(a)

(b)

BATTERY CASE

TECHNICAL FIELD

The present invention relates to a battery case comprising a safety valve for releasing internal pressure when internal pressure has risen.

BACKGROUND ART

In a lithium ion secondary battery or another secondary battery, an electrode, an electrolyte, or the like is accommodated in a battery case. In such secondary batteries, internal pressure rises to an abnormal level when hydrogen gas is produced in the interior of the battery case due to a defect. Therefore, a safety valve is provided such that a breakage groove is formed in the battery case, and when the internal pressure of the battery case rises, the breakage groove is cleaved by the internal pressure and the internal pressure is released (see Patent Document 1).

In the battery case disclosed in Patent Document 1, a recessed part having a trapezoidal cross section and an ellipsoidal planar shape is formed in the bottom surface of the battery case, and a breakage groove is formed annularly along the side surface of this recessed part. With this configuration, the internal pressure at which the breakage groove cleaves can be controlled via the wall thickness (remaining thickness) in the bottom part of the breakage groove.

PRIOR ART DOCUMENTS

Patent Documents

[Patent Document 1] JP-A 2009-4271 (FIG. 3 etc.)

SUMMARY OF THE INVENTION

Problems to be Solved by the Invention

However, with a configuration in which the working pressure of the safety valve is controlled according to the wall thickness (remaining thickness) in the bottom part of the breakage groove, as in the battery case disclosed in Patent Document 1, a problem is encountered in that the breakage groove cleaves even without the internal pressure reaching the set pressure. Specifically, with a secondary battery, the internal pressure fluctuates along with repeated charging and discharging; therefore, compressive stress and tensile stress therefore repeatedly act on the breakage groove, which wears out the bottom part of the breakage groove, reduces strength, and causes the breakage groove to cleave even when the internal pressure has not reached the set pressure. More specifically, with a secondary battery, because heat is generated during charging, the temperature of the secondary battery rises and the internal pressure rises, and because heat is not generated during discharge, the temperature of the secondary battery falls and the internal pressure falls. The internal pressure also fluctuates along with changes in the environmental temperature, the breakage groove wears out, and the breakage groove may be cleaved even when the internal pressure has not reached the set pressure.

In view of the problems described above, a purpose of the present invention is to provide a battery case in which working pressure can be stabilized in a safety valve in which a breakage groove is used.

Means to Solve the Problems

To solve the problems described above, the present invention is directed to a battery case in which a breakage groove for a safety valve is formed in a plate part constituting any surface of a case formed by machining a metal plate, the battery case characterized in that a first recessed part indented inward with respect to the case is formed in the plate part, and the breakage groove is formed in the middle or substantially the middle of a bottom part of the first recessed part.

The meaning of the phrase "the breakage groove is formed in the middle or substantially the middle of the bottom part of the first recessed part" in the present invention is not limited to referring to the widthwise middle of the bottom part of the first recessed part, and can include configurations in which the breakage groove is formed in a readily deformable section (near the center) of the bottom part of the first recessed part.

In the battery case according to the present invention, because the breakage groove for the safety valve is formed in the bottom part of the first recessed part in which the plate part constituting any surface of the case is indented inward with respect to the case, when the internal pressure fluctuates along with repeated charging and discharging or the like, the change in internal pressure is absorbed by the first recessed part deforming outward and inward with respect to the case. Therefore, the breakage groove is not subjected to excessive compressive stress or excessive tensile stress, and will not readily wear out. Therefore, the breakage groove does not cleave except for when the internal pressure reaches a level that exceeds normal rises in pressure, such as those during charging and rises in the environmental temperature. The working pressure of the safety valve can therefore be stabilized. Because the breakage groove is formed in the middle or substantially the middle of the readily deforming first recessed part, when the first recessed part bulges toward the outside of the case, compressive stress first acts on the breakage groove, after which tensile stress acts and the breakage groove cleaves. Therefore, the breakage groove reliably cleaves even if the groove bottom part has a certain degree of thickness. Therefore, because the strength of the breakage groove can be increased, the breakage groove will rarely cleave while the secondary battery is being assembled. The battery case is therefore easily handled. In the present invention, because of a configuration in which two stages of pressure are incurred; i.e., the deformation of the first recessed part and the cleaving of the breakage groove, there are many parameters for setting the working pressure, such as the thickness and shape of the groove bottom part of the breakage groove and the shape of the first recessed part, and the working pressure can therefore be set to any desired level. When the recessed part is fashioned into a curved shape, the recessed part readily deforms and readily absorbs pressure.

In the present invention, in the first connecting portion and the second connecting portion that connect to the first recessed part on both sides flanking the first recessed part in the plate part, the ratio between the height dimension of the first connecting portion from the bottom part of the first recessed part and the height dimension of the second connecting portion from the bottom part of the first recessed part is preferably within a range from 0.5:1.0 to 1.0:0.5. With this configuration, the shape when the first recessed part deforms is easily controlled, and the working pressure of the safety valve can therefore be stabilized. Because the shape when the first recessed part deforms is easily controlled, it is possible to inhibit unnecessary force from being imparted to the breakage groove when the first recessed part deforms.

In the present invention, the first connecting portion and/or the second connecting portion are preferably each composed of a folded portion in which the plate part is folded multiple times in the thickness direction. With this configuration, changes in internal pressure are readily absorbed because even the folded portion deforms.

In the present invention, the portion in the folded portion that overlaps the case-outer-side surface of the plate part is preferably set apart from the case-outer-side surface of the plate part. With this configuration, changes in internal pressure are readily absorbed because even the folded portion readily deforms.

In the present invention, a second recessed part, recessed inward with respect to the case, is preferably formed in the side of the first connecting portion opposite the first recessed part, and/or in the side of the second connecting portion opposite the first recessed part. With this configuration, the rigidity of the locations adjacent to the first recessed part (the first connecting portion and/or the second connecting portion) can be increased, and deformation in the first recessed part is therefore easily induced.

In the present invention, the breakage groove is preferably formed in the case-outer-side surface of the bottom part of the first recessed part. With this configuration, the breakage groove begins to open when the first recessed part bulges toward the outside of the case, and the breakage groove can therefore be reliably cleaved.

In the present invention, preferably, the bottom part of the first recessed part has a flat surface part, the breakage groove being formed in the flat surface part. With this configuration, the thickness of the groove bottom part is easily controlled when the breakage groove is formed.

In the present invention, preferably, the first recessed part extends as a groove in the plate part, and the breakage groove extends along the extending direction of the first recessed part.

In the present invention, the first recessed part is preferably formed in a circumferentially continuous annular shape.

In this case, the breakage groove preferably extends circumferentially along the first recessed part with at least one noncontinuous portion. With this configuration, the position where the breakage groove cleaves can be specified, and the shape of the breakage groove after cleaving (after the safety valve activates) can therefore be controlled. Broken pieces can also be prevented from scattering when the breakage groove cleaves. The noncontinuous portion also affects the strength of the breaking portion, and it is therefore possible to suppress wearing out of the breakage groove and control the breaking pressure depending on the positions and number of noncontinuous portions.

The present invention may employ a configuration in which the first recessed part is formed as a circle in the plate part, and the breakage groove comprises two grooves intersecting in the middle or substantially the middle of the bottom part of the first recessed part. With this configuration, the breakage groove reliably cleaves when the internal pressure reaches a level that exceeds normal rises in pressure, such as those during charging and rises in the environmental temperature.

In this case, the two grooves preferably intersect at right angles. With this configuration, the four portions partitioned by the two grooves in the bottom part of the first recessed part have similar strength, and therefore similarly deform when the internal pressure rises. Therefore, the breakage groove does not cleave unexpectedly.

In the bottom part of the first recessed part, reinforcing recessed parts are preferably formed in the four portions partitioned by the two grooves. With this configuration, the four portions partitioned by the two grooves have sufficient strength, and the breakage groove therefore does not cleave with normal rises in internal pressure, such as those during charging and rises in the environmental temperature.

Effect of the Invention

In the battery case according to the present invention, even when the internal pressure fluctuates along with repeated charging and discharging or the like, the incurred change in internal pressure is absorbed by the first recessed part deforming outward or inward with respect to the case. Therefore, the breakage groove is not subjected to excessive compressive stress or excessive tensile stress, and does not readily wear out. Therefore, the breakage groove does not cleave except when the internal pressure reaches a level that exceeds normal rises in pressure, such as those during charging and rises in the environmental temperature. The working pressure of the safety valve can therefore be stabilized. Because the breakage groove is formed in the middle or substantially the middle of the bottom part of the readily deforming first recessed part, when the first recessed part bulges toward the outside of the case, compressive stress first acts on the breakage groove, after which tensile stress acts and the breakage groove cleaves. Therefore, the breakage groove reliably cleaves even if the groove bottom part is thick to a certain extent. Therefore, it is rare that the breakage groove cleaves while the secondary battery is being assembled because the strength of the breakage groove can be increased. The battery case is therefore easily handled. In the present invention, because of a configuration in which two stages of pressure are incurred; i.e., the deformation of the first recessed part and the cleaving of the breakage groove, there are many parameters for setting the working pressure, such as the thickness and shape of the groove bottom part of the breakage groove and the shape of the first recessed part, and the working pressure can therefore be set to any desired level.

MODE FOR CARRYING OUT THE INVENTION

Embodiments of the present invention are described with reference to the drawings.

Embodiment 1

(Overall Configuration of Battery Case)

Figure 1:
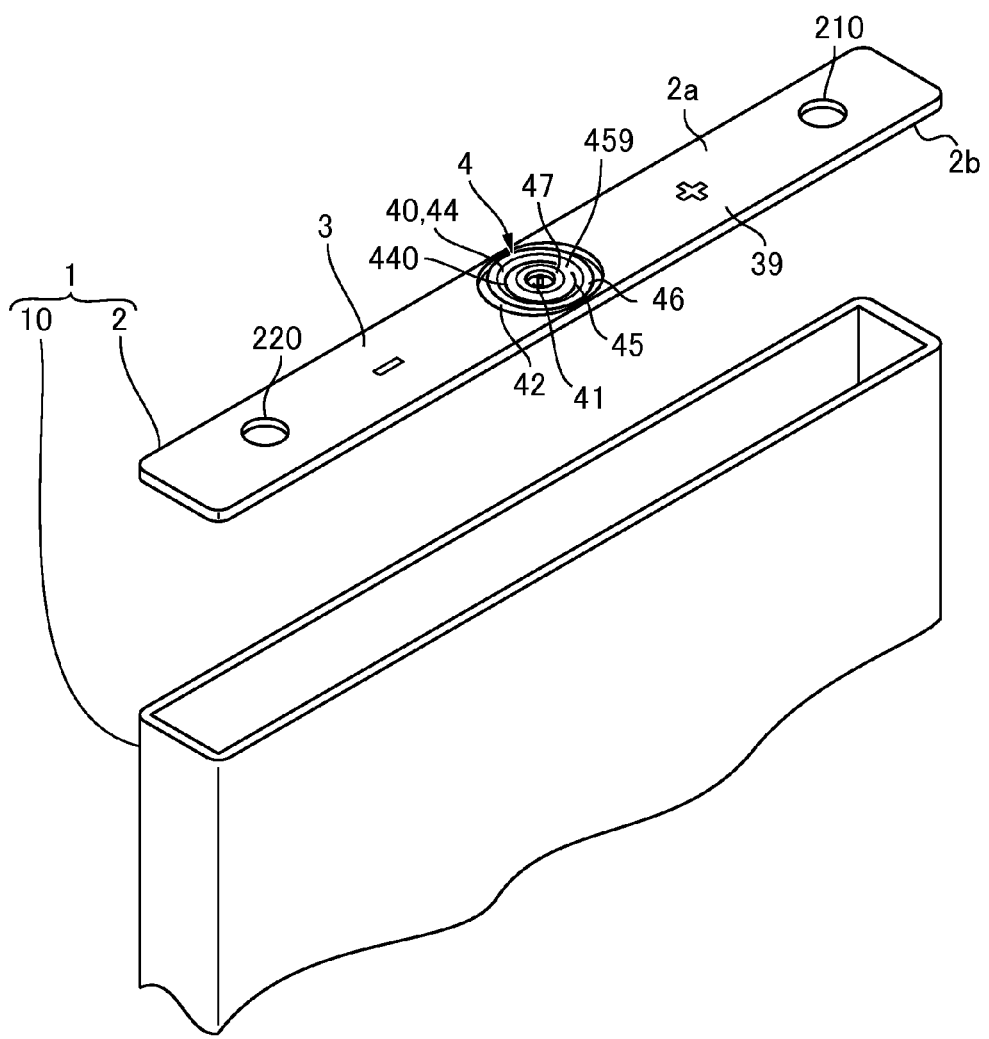
FIG. 1 is an external perspective view of a battery case according to Embodiment 1 of the present invention.

FIG. 1 is an external perspective view of a battery case 1 according to Embodiment 1 of the present invention, showing the battery case 1 as being disassembled into a case main body 10 and a lid 2.

The battery case 1 according to the present embodiment has a case main body 10 in the shape of a flat rectangular box and a plate-shaped lid 2 for closing an opening in the case main body 10 as shown in FIG. 1, and the case main body 10 and lid 2 are both manufactured by subjecting metal plates to pressing or another type of machining. In the present embodiment, both the case main body 10 and the lid 2 are manufactured by pressing or otherwise machining plates of an aluminum alloy measuring 0.3 mm to 3.0 mm in thickness. The case main body 10 and the lid 2 may also be manufactured by pressing or otherwise machining plates of copper, iron, or another metal.

The interior of the battery case 1 accommodates an electrode (not shown) and an electrolyte for a lithium ion secondary battery or another secondary battery. In the present embodiment, the lid 2 is secured by laser welding or another method while closing the opening in the case main body 10, whereby the battery case 1 is hermetically sealed, in which state the lid 2 constitutes one surface of the battery case 1. For the sake of convenience in the following description, the surface 2a in the lid 2 that faces the outside of the case is described as the front surface or the top surface, and the surface 2b that faces the inside of the case is described as the rear surface or bottom surface.

In the battery case 1 of the present embodiment, due to the metal plate being pressed or otherwise machined, the lid 2 has a structure in which the safety valve 4 is formed in the center position of a plate part 3 that closes the opening in the case main body 10. The safety valve 4 is normally closed when the battery case 1 is used as part of a secondary battery, and the safety valve is open, taking on the function of releasing internal pressure in the battery case 1, when the internal pressure of the battery case 1 has risen excessively.

Formed in the vicinities of both lengthwise ends of the lid 2 are terminal holes 210, 220 in which secondary battery terminals (not shown) are disposed. Of these two terminal holes 210, 220, a positive electrode terminal is disposed in the terminal hole 210, and a negative electrode terminal is disposed in the other terminal hole 220. An injection hole or the like (not shown) for injecting electrolyte may also be formed in the lid 2.

(Configuration of Safety Valve 4)

Figure 2:
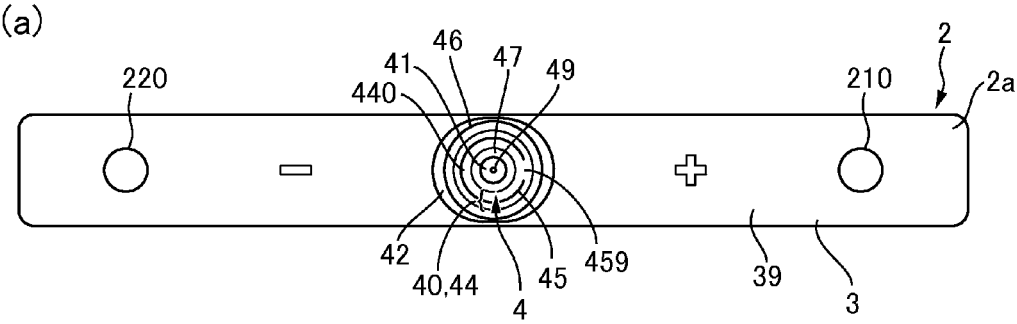
FIG. 2 includes explanatory drawings showing the configuration of a lid of the battery case according to Embodiment 1 of the present invention.
Figure 2:
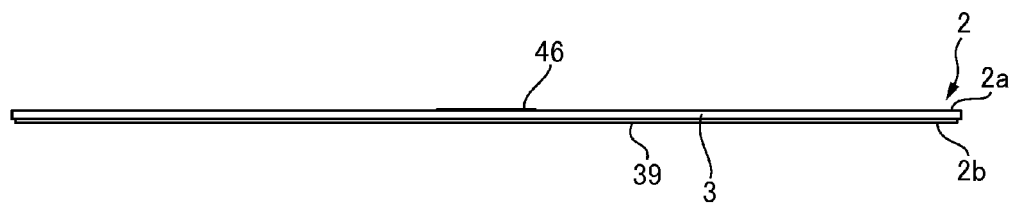
Figure 2:
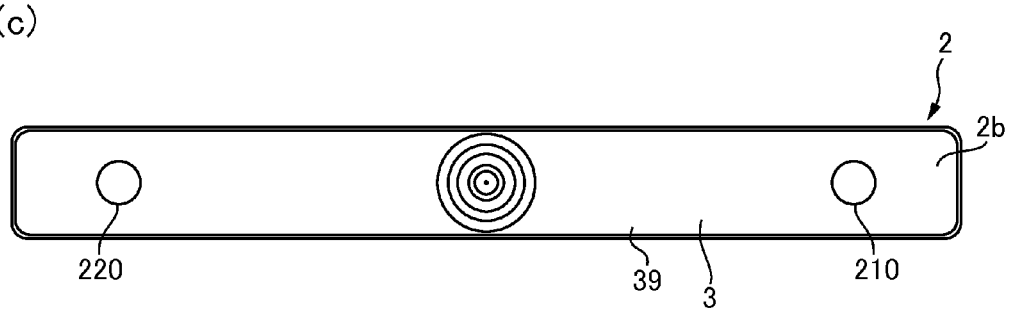
Figure 2:
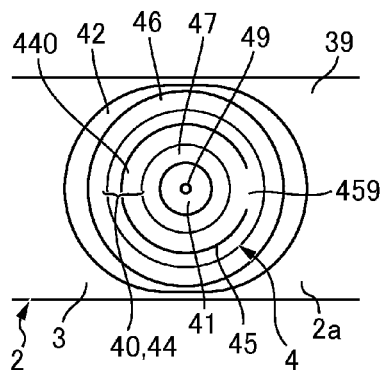
Figure 2:
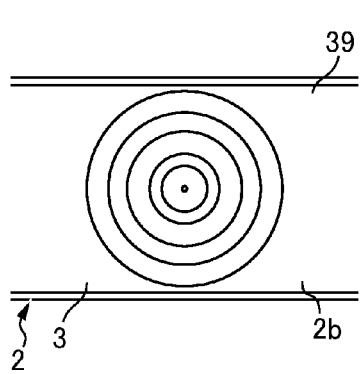
Figure 3:
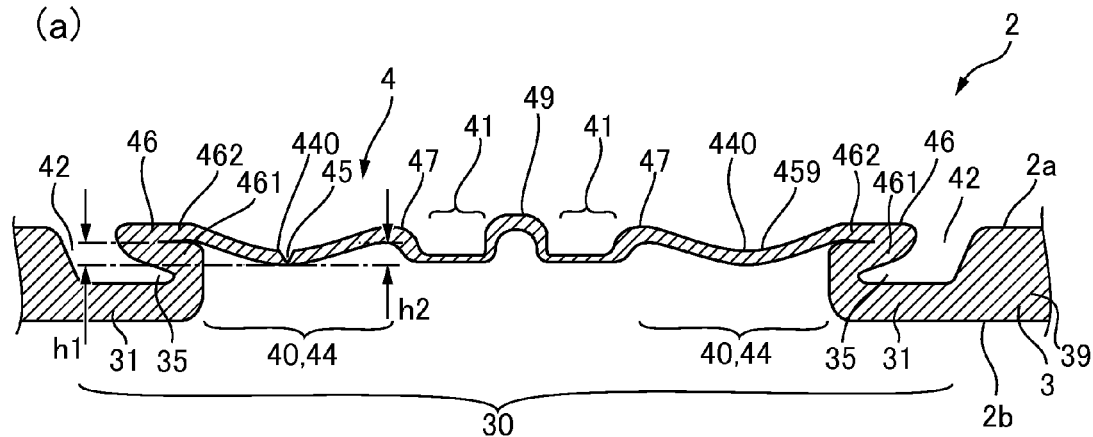
FIG. 3 includes explanatory drawings of a safety valve formed in the lid of the battery case according to Embodiment 1 of the present invention.
Figure 3:
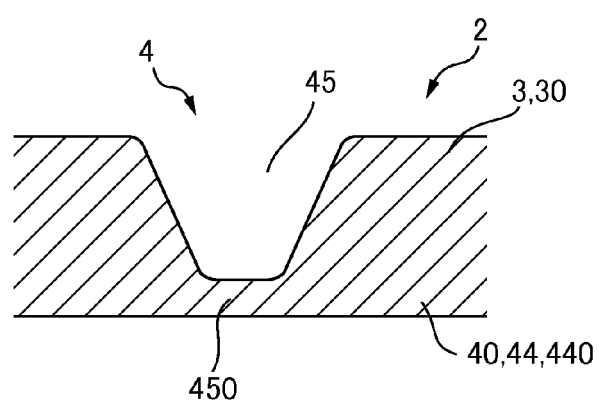
Figure 3:
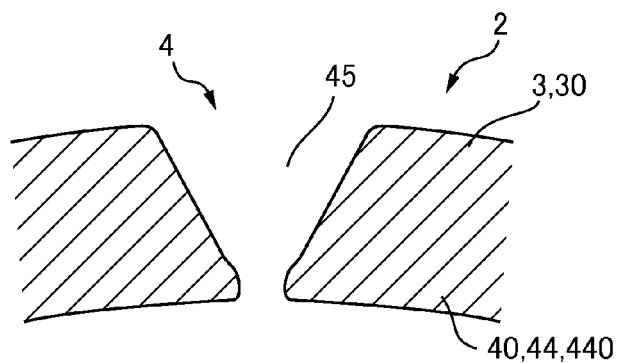

FIG. 2 includes explanatory drawings showing the configuration of the battery case 1 and the lid 2 according to Embodiment 1 of the present invention, FIGS. 2(a), (b), (c), (d), and (e) being, respectively, a plan view of the lid 2 as seen from the outside of the case, a front view of the lid 2, a bottom view of the lid 2 as seen from the inside of the case, an explanatory drawing showing an enlarged view of the safety valve 4 formed in the lid 2 as seen from the outside of the case, and an explanatory drawing showing an enlarged view of the safety valve 4 formed in the lid 2 as seen from the inside of the case. FIG. 3 includes explanatory drawings of the safety valve 4 formed in the lid 2 of the battery case 1 according to Embodiment 1 of the present invention, FIGS. 3(a), (b), and (c) being, respectively, an enlarged cross-sectional view of the safety valve 4, a further enlarged cross-sectional view of a breakage groove 45, and an enlarged cross-sectional view of the breakage groove 45 after the groove has been cleaved.

In the lid 2, a thin plate portion 30 obtained by reducing the thickness of the plate part 3 by pressing is formed in the plate part 3, as shown in FIGS. 2 and 3. Formed in this thin plate portion 30 is a curved part 44 (first recessed part 40) in which the thin plate portion 30 is indented inward, with respect to the case, in a curved shape. In the present embodiment, the thin plate portion 30 is formed as a circular area, and the curved part 44 (first recessed part 40) is formed as an annular area concentric with the thin plate portion 30 by extending circumferentially and being circumferentially continuous. The area excluding the thin plate portion 30 in the plate part 3 is a flat plate portion 39 thicker than the thin plate portion 30. In the present embodiment, the thin plate portion 30 differs in thickness depending on the regions described hereinafter, but the thickness of the thin plate portion 30 is approximately 0.1 mm to 0.8 mm. The thickness of the curved part 44 constituting the first recessed part 40 is approximately 0.2 mm to 0.5 mm.

A first connecting portion 46 and a second connecting portion 47 of the plate part 3, which connect to the curved part 44 (first recessed part 40) on both sides flanking the curved part 44, are at positions protruding toward the outside of the case from the plate part 3. The first connecting portion 46 and the second connecting portion 47 extend circularly along the curved part 44 on both sides flanking the curved part 44.

In the first connecting portion 46 and the second connecting portion 47, the ratio between a height dimension h1 of the first connecting portion 46 from a bottom part 440 of the curved part 44 and a height dimension h2 of the second connecting portion 47 from the bottom part 440 of the curved part 44 is set in a range from 0.5:1.0 to 1.0:0.5. Specifically, the height dimension h1 of the first connecting portion 46 from the bottom part 440 of the curved part 44 and the height dimension h2 of the second connecting portion 47 from the bottom part 440 of the curved part 44 are set so as to greatly differ. In the present embodiment, the ratio between the height dimension h1 of the first connecting portion 46 from the bottom part 440 of the curved part 44 and the height dimension h2 of the second connecting portion 47 from the bottom part 440 of the curved part 44 is generally set to 1.0:1.0.

On the side of the second connecting portion 47 opposite the first recessed part 40, a second recessed part 41 indented inward with respect to the case is formed by pressing, and this second recessed part 41 also extends circularly along the first recessed part 40, similar to the second connecting portion 47. In the present embodiment, a convex part 49 protruding toward the outside of the case is formed by pressing in the center of the second recessed part 41. The thickness of the second connecting portion 47 is approximately 0.75 mm, and the thickness of the portion constituting the second recessed part 41 is approximately 0.1 mm.

A second recessed part 42 indented inward with respect to the case is formed on the side of the first connecting portion 46 opposite the first recessed part 40, and this second recessed part 42 is equivalent to an external peripheral portion 31 of the thin plate portion 30. The second recessed part 42 also extends circularly along the first recessed part 40, similar to the second connecting portion 47. Therefore, the convex part 49, the second recessed part 41, the second connecting portion 47, the first recessed part 40, the first connecting portion 46, and the second recessed part 42 are formed concentrically from the center toward the external periphery in the lid 2. A plurality of annular convex parts and recessed parts corresponding to these shapes are formed in the surface 2b (rear surface) of the lid 2 on the inside of the case.

The first connecting portion 46 is a folded portion where the thin plate portion 30 is folded multiple times in the thickness direction of the plate part 3. More specifically, the first connecting portion 46 (folded portion) comprises a lower layer portion 461 bent radially outward from the inner edge of the external peripheral portion 31 positioned farthest in the external periphery of the thin plate portion 30 so as to overlap the external peripheral portion 31, and an upper layer portion 462 bent radially inward from the side of the lower layer portion 461 opposite the external peripheral portion 31 so as to overlap the lower layer portion 461, and the curved part 44 forming the first recessed part 40 is a continuation of this upper layer portion 462.

In the present embodiment, the portion of the first connecting portion 46 (folded portion) that overlaps the case-outer-side surface of the plate part 3 is separated from the case-outer-side surface of the plate part 3. Specifically, in the first connecting portion 46 (folded portion), the external peripheral portion 31 and the lower layer portion 461 are separated, and an annular gap 35 is opened between the external peripheral portion 31 and the lower layer portion 461.

In the lid 2 thus configured, the breakage groove 45 constituting the safety valve 4 is formed in the widthwise middle or substantially the middle of the first recessed part 40 (curved part 44). In the present embodiment, the breakage groove 45 extends along the first recessed part 40 in a widthwise middle position of the first recessed part 40. The breakage groove 45 herein comprises a noncontinuous portion 459 in one location in the circumferential direction. Specifically, the breakage groove 45 comprises a noncontinuous portion 459 in the side where the terminal hole 210, in which the positive electrode terminal is disposed, is positioned in the longitudinal direction of the lid 2. In the present embodiment, a single noncontinuous portion 459 is formed, but a plurality of noncontinuous portions 459 may also be formed.

The breakage groove 45 has a substantially V-shaped cross section as shown in FIG. 3(b), and a groove bottom part 450 is set with a predetermined thickness according to the set breakage load. In the present embodiment, the thickness of the bottom part 440 of the first recessed part 40 (curved part 44) is approximately 0.25 mm to 0.5 mm, and the thickness of the groove bottom part 450 is approximately 0.03 mm to 0.08 mm. As is described below, the breakage groove 45 is cleaved as shown in FIG. 3(c) when the internal pressure of the battery case 1 has risen excessively, and the breakage groove functions as a safety valve 4 for releasing the internal pressure out of the battery case 1.

(Function of Safety Valve 4 Etc.)

Figure 4:
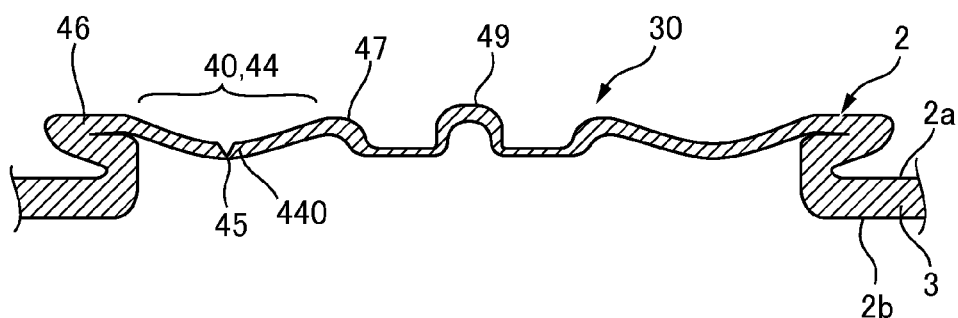
FIG. 4 includes explanatory drawings showing the change in the shape of the safety valve accompanying a rise in internal pressure in the battery case according to Embodiment 1 of the present invention.
Figure 4:
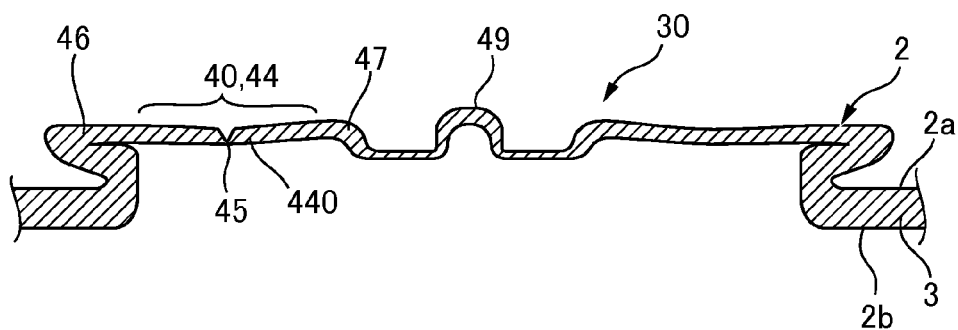
Figure 4:
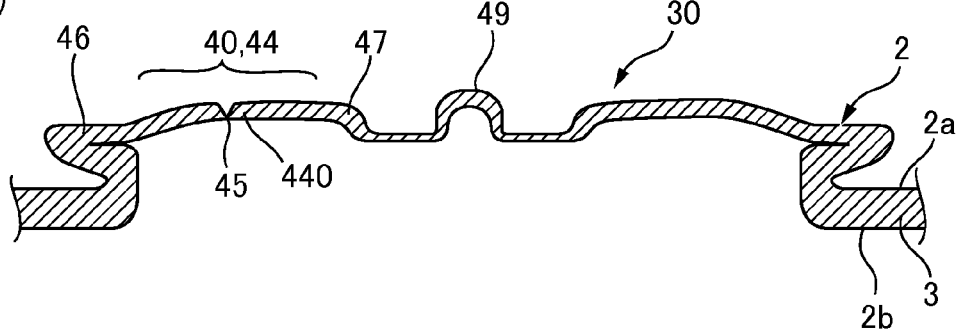
Figure 5:
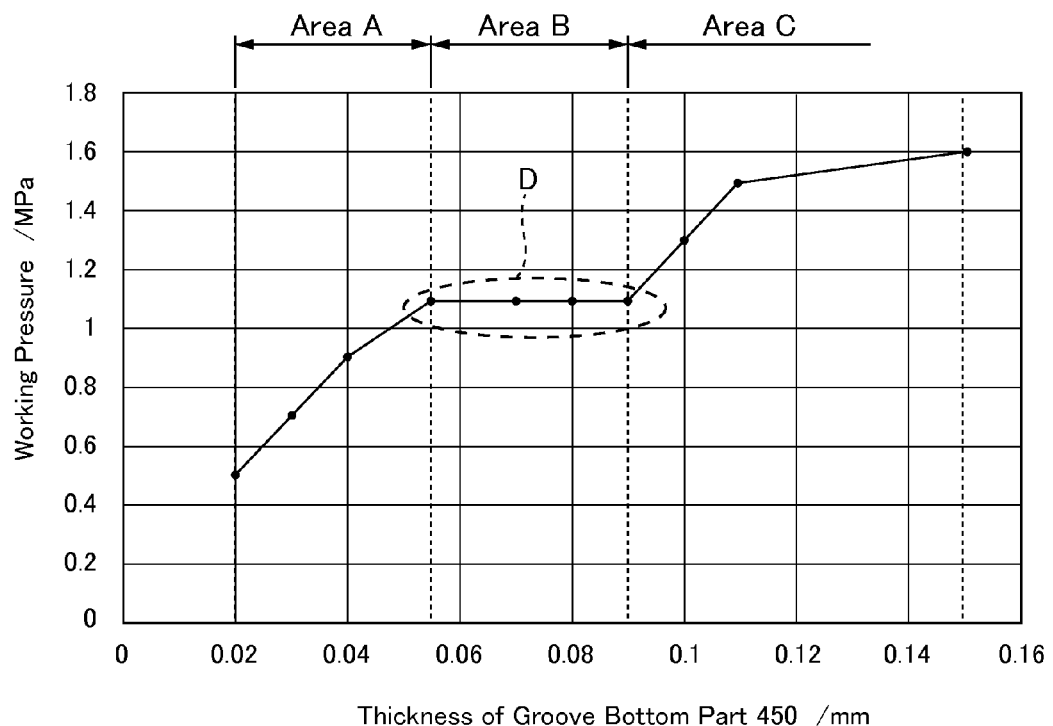
FIG. 5 is a graph showing the relationship between the thickness of the groove bottom part of the breakage groove and the working pressure of the safety valve in the battery case according to Embodiment 1 of the present invention.

FIG. 4 includes explanatory drawings showing the change in the shape of the safety valve 4 accompanying an increase in internal pressure in the battery case 1 according to Embodiment 1 of the present invention, FIGS. 4(a), (b), and (c) being, respectively, an explanatory drawing of the safety valve 4 when the internal pressure is normal, an explanatory drawing of the safety valve 4 when the internal pressure has risen, and an explanatory drawing of the safety valve 4 when the internal pressure has risen further. FIG. 5 is a graph showing the relationship between the thickness of the groove bottom part 450 of the breakage groove 45 and the working pressure of the safety valve 4 in the battery case 1 according to Embodiment 1 of the present invention. The relationship shown in FIG. 5 is the result when a JIS 3000 (Al—Mn) aluminum alloy is used and the thickness of the bottom part 440 of the curved part 44 is 0.27 mm.

In a secondary battery using the battery case 1 of the present embodiment, the internal pressure fluctuates along with repeated charging and discharging. More specifically, with a secondary battery, because heat is generated during charging, the temperature of the secondary battery rises and the internal pressure rises, and because heat is not generated during discharge, the temperature of the secondary battery falls and the internal pressure falls. The internal pressure sometimes also fluctuates along with changes in the environmental temperature.

When there has been such an increase in internal pressure, the lid 2 deforms so that the entire thin plate portion 30 is displaced toward the outside of the case and the curved part 44 deforms toward the outside of the case, in the manner of changing from the state shown in FIG. 4(a) to the state shown in FIG. 4(b). The folded portion constituting the first connecting portion 46 also deforms at this time. When charging stops and the internal pressure falls, the lid 2 returns from the state shown in FIG. 4(b) to the state shown in FIG. 4(a), such that the entire thin plate portion 30 is displaced toward the inside of the case and the curved part 44 also deforms toward the inside of the case.

When the internal pressure rises, the entire thin plate portion 30 of the lid 2 is displaced toward the outside of the case as in the states shown in FIGS. 4(a) to 4(b), and when the internal pressure further rises after the curved part 44 has deformed toward the outside of the case, the lid 2 deforms so that the entire thin plate portion 30 is further displaced toward the outside of the case and the curved part 44 bulges toward the outside of the case, as in the states shown in FIGS. 4(b) to 4(c). The folded portion constituting the first connecting portion 46 also deforms. At the point in time that the internal pressure exceeds a set value, the breakage groove 45 cleaves as shown in FIG. 3(c). Therefore, internal pressure can be released out of the battery case 1.

In the present embodiment, the thickness and other features of the groove bottom part 450 are set so that the breakage groove 45 cleaves at the point in time that the internal pressure exceeds 1.1 MPa (the set value). In the present embodiment, the breakage groove 45 is set so as to cleave at the point in time that the internal pressure exceeds 1.1 MPa (the set value) even when the thickness of the groove bottom part 450 varies somewhat.

More specifically, the working pressure (the pressure at which the breakage groove 45 cleaves) of the safety valve 4 rises as the thickness of the groove bottom part 450 is increased, as shown in FIG. 5. In the present embodiment, even if the internal pressure increases, when the internal pressure is comparatively low, the increase in internal pressure is absorbed by the deformation of the thin plate portion 30 and/or the first recessed part 40. Therefore, the graph contains an area A in which the working pressure of the safety valve 4 increases linearly as the thickness of the groove bottom part 450 increases, an area B in which the working pressure of the safety valve 4 does not substantially change even if the thickness of the groove bottom part 450 is increased, and an area C in which the working pressure of the safety valve 4 increases linearly as the thickness of the groove bottom part 450 increases, as can be seen from FIG. 5. In view of this, in the present embodiment, the thickness of the groove bottom part 450 is set in a condition (the condition enclosed by the dotted line D) equivalent to the area B in which the working pressure of the safety valve 4 does not substantially change even if the thickness of the groove bottom part 450 is increased. More specifically, the thickness of the groove bottom part 450 is set to 0.07 mm. With this condition, the breakage groove 45 reliably cleaves at the point in time that the internal pressure exceeds 1.1 MPa (the set value), even when the thickness of the groove bottom part 450 somewhat varies.

(Method for Manufacturing Battery Case 1)

Figure 6:
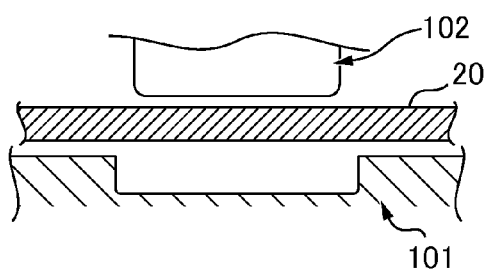
FIG. 6 includes step cross-sectional views showing the method of forming the safety valve in the lid, which are some of the steps for manufacturing the battery case according to Embodiment 1 of the present invention.
Figure 6:
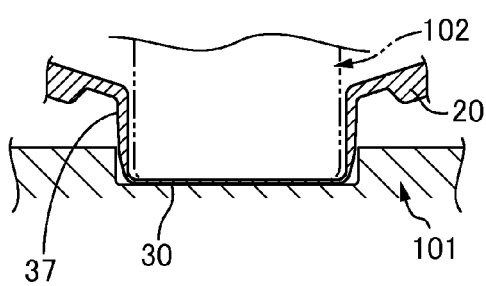
Figure 6:
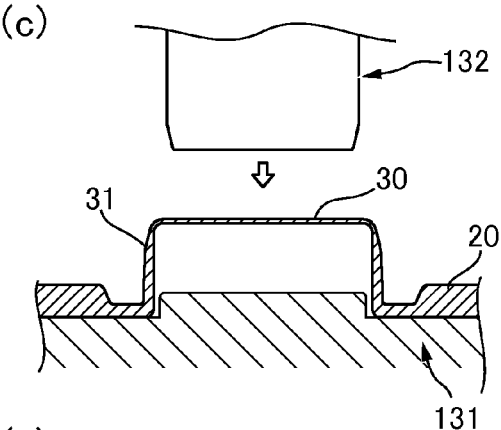
Figure 6:
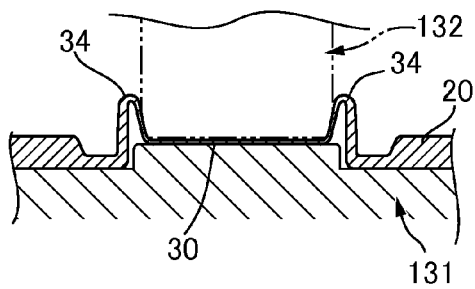
Figure 6:
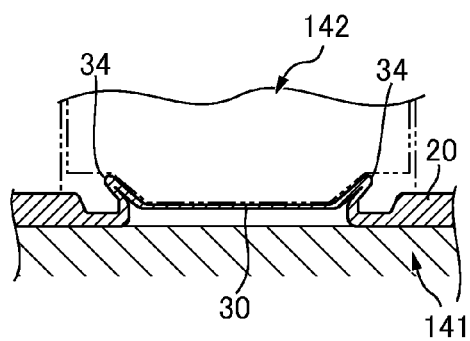
Figure 6:
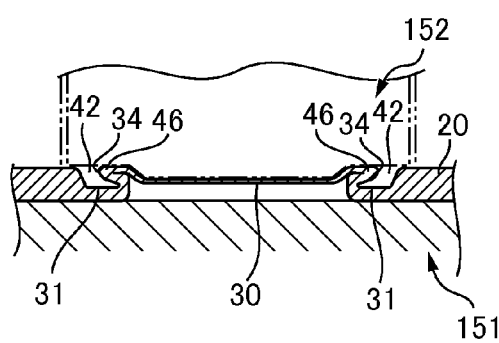
Figure 6:
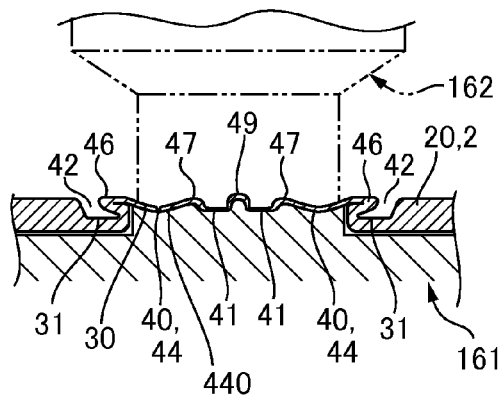

FIG. 6 includes step cross-sectional views showing the method of forming the safety valve 4 in the lid 2, which are some of the steps for manufacturing the battery case 1 according to Embodiment 1 of the present invention.

The steps of forming the safety valve 4 in the lid 2 of the battery case 1 of the present embodiment include performing a stretch forming step, a first straightening step, a second straightening step, a bending step, a preliminary folding step, a main bending step, and a groove part forming step, as is described below with reference to FIG. 6.

Specifically, first, in the stretch forming step shown in FIG. 6(*a*), a plate 20 composed of an aluminum alloy is pressed using a stretch forming die 101 as a lower die and a stretch forming punch 102 as an upper die, and a cylindrical wall part 37 and the thin plate portion 30 are formed as shown in FIG. 6(*b*).

Next, in the first straightening step, though not illustrated, the thin plate portion 30 is flattened using a straightening die and a straightening punch. In the second straightening step, though not illustrated, the cylindrical wall part 37 is straightened so as to be vertical using a straightening die and a straightening punch.

Next, in the bending step shown in FIGS. 6(*c*) and (*d*), the thin plate portion 30 is bent using a bending die 131 as a lower die and a bending punch 132, and a bent part 34 is formed.

Next, in the preliminary folding step shown in FIG. 6(*e*), a preliminary step is performed for tilting the bent part 34 outward and folding the bent part 34 using a preliminary folding die 141 as a lower die and a preliminary folding punch 142 as an upper die.

Next, in the main folding step shown in FIG. 6(*f*), the bent part 34 is folded using a main folding die 151 as a lower die and a main folding punch 152 as an upper die. As a result, a folded portion (the first connecting portion 46) is formed, which comprises the lower layer portion 461 bent so as to overlap the external peripheral portion 31 of the thin plate portion 30, and the upper layer portion 462 bend so as to overlap the lower layer portion 461, as was described with reference to FIG. 3.

Next, in the groove part forming step shown in FIG. 6(*g*), the thin plate portion 30 is pressed using a groove part forming die 161 as a lower die and a groove part forming punch 162 as an upper die, and the convex part 49, the second recessed part 41, the second connecting portion 47, and the curved part 44 (the first recessed part 40) described with reference to FIG. 3 are formed. The breakage groove 45 is simultaneously formed in the bottom part 440 of the curved part 44 at this time.

(Main Effect of the Present Embodiment)

As described above, in the lid 2 of the battery case 1 of the present embodiment, the curved part 44 (the first recessed part 40) is formed in which the plate part 3 is indented inward, with respect to the case, in a curved shape, and the breakage groove 45 for the safety valve 4 is formed in the middle or substantially the middle of the bottom part 440 of the curved part 44. Therefore, even when the internal pressure fluctuates along with repeated charging and discharging or the like, the incurred change in internal pressure is absorbed by the curved part 44 deforming outward or inward with respect to the case. Therefore, the breakage groove 45 is not subjected to excessive compressive stress or excessive tensile stress, and the breakage groove 45 does not readily wear out. Particularly in the present embodiment, there is no corner portion that hinders deformation because the portion where the breakage groove 45 is the curved part 44. Therefore, the curved part 44 can be reliably deformed so as conform to the change in internal pressure caused by the repeated charging and discharging or the like. Therefore, the breakage groove 45 does not readily wear out because the fluctuation in internal pressure accompanying the repeated charging and discharging or the like can be reliably absorbed by the deformation of the curved part 44. Therefore, the breakage groove 45 does not cleave except for when the internal pressure reaches a level that exceeds normal rises in pressure, such as those during charging and rises in the environmental temperature. The working pressure of the safety valve 4 can therefore be stabilized.

Because the breakage groove 45 is formed in the middle or substantially the middle of the readily deforming curved part 44, when the curved part 44 bulges toward the outside of the case, compressive stress first acts on the breakage groove 45, after which tensile stress acts and the breakage groove 45 cleaves. Therefore, the breakage groove 45 reliably cleaves even if the groove bottom part 450 is of a certain degree of thickness. Therefore, situations in which the breakage groove 45 cleaves while the secondary battery is being assembled are not likely because the strength of the breakage groove 45 can be increased. The battery case 1 is therefore easily handled.

Because of a configuration in which two stages of pressure are incurred; i.e., the deformation of the curved part 44 and the cleaving of the breakage groove 45, there are many parameters for setting the working pressure, such as the thickness and shape of the groove bottom part 450 of the breakage groove 45, and the shape of the curved part 44, and the working pressure can therefore be set to any desired level.

Furthermore, in the present embodiment, because the thin plate portion 30 is formed in the plate part 3 constituting the lid 2 and the safety valve 4 is provided in the thin plate portion 30, the safety valve 4 does not protrude toward the outside of the case any more than is necessary. This has the advantage of providing minimal risk of damaging the safety valve 4 during work such as attaching the lid 2.

In the present embodiment, because the first connecting portion 46 and the second connecting portion 47, which connect to the curved part 44 on both sides flanking the curved part 44 in the plate part 3, are at positions protruding toward the outside of the case from the plate part 3, the structure is such that the bottom part 440 of the curved part 44 either does not protrude from the case-inner-side surface of the plate part 3 or protrudes only slightly, even when a curved part 44 indented inward with respect to the case is formed. Because the ratio between the height dimension h1 of the first connecting portion 46 from the bottom part 440 of the curved part 44 and the height dimension h2 of the second connecting portion 47 from the bottom part 440 of the curved part 44 is within a range from 0.5:1.0 to 1.0:0.5, the shape when the curved part 44 deforms is easily controlled. Therefore, the working pressure of the safety valve 4 can be stabilized. Because the shape when the curved part 44 deforms is easily controlled, the incurring of unnecessary force on the breakage groove 45 can be suppressed when the curved part 44 deforms.

The first connecting portion 46 readily absorbs changes in internal pressure accompanying repeated charging and discharging and the like, because this portion is composed of a folded portion where the thin plate portion 30 is folded multiple times in the thickness direction of the plate part 3, and the folded portion therefore also deforms. Moreover, the portion that within the folded portion overlaps the case-outer-side surface of the plate part 3 is separated from the case-outer-side surface of the plate part 3. Therefore, the folded portion also deforms readily and therefore readily absorbs changes in internal pressure.

Because the second recessed part 42 is formed on the side of the first connecting portion 46 opposite the curved part 44 and the second recessed part 41 is formed on the side of the second connecting portion 47 opposite the curved part 44, the rigidity of locations adjacent to the curved part 44 (the first connecting portion 46 and the second connecting portion 47) can be increased. Deformation in the curved part 44 is therefore readily induced.

Because the breakage groove 45 is formed on the case-outer-side surface of the bottom part 440 of the curved part 44, the breakage groove 45 begins to open when the curved part 44 bulges toward the outside of the case, and the breakage groove 45 can therefore be reliably cleaved. The noncontinuous portion 459 is also formed in the breakage groove 45 at a part through the circumferential direction. Therefore, the position where the breakage groove 45 cleaves can be specified, and the shape of the breakage groove 45 after cleaving (after the working of the safety valve) can be controlled. Scattering of broken pieces can also be prevented when the breakage groove 45 cleaves. The noncontinuous portion 459 also affects the strength of the breaking portion, and it is therefore possible to suppress the wearing out of the breakage groove and to control the breaking pressure through the positions and number of noncontinuous portions 459.

(Other Embodiment of Curved Part 44)

Figure 7:
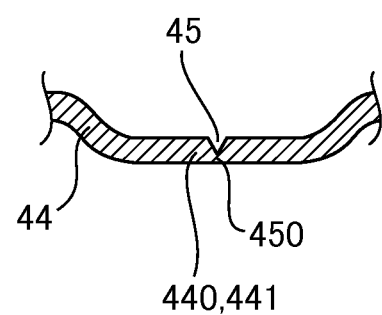
FIG. 7 is an explanatory drawing showing another embodiment of the safety valve formed in the battery case according to Embodiment 1 of the present invention.

FIG. 7 is an explanatory drawing showing another embodiment of the safety valve 4 formed in the battery case 1 according to Embodiment 1 of the present invention. In the battery case 1 described with reference to FIGS. 1 to 6, the bottom part 440 of the curved part 44 is also curved, but in the present embodiment, the bottom part 440 of the curved part 44 is a flat surface part 441 and the breakage groove 45 is formed in the middle or substantially the middle of the flat surface part 441, as shown in FIG. 7.

With this configuration, the thickness of the breakage groove 450 is easily controlled when the breakage groove 45 is formed.

(Modifications of Embodiment 1)

In the above Embodiment 1, the first connecting portion 46 is made into a folded portion, but other acceptable options include a structure in which the second connecting portion 47 is made into a folded portion, or both the first connecting portion 46 and the second connecting portion 47 are made into folded portions.

In the above Embodiment 1, the safety valve 4 is formed in the lid 2 of the battery case 1, but the safety valve may also be formed in the side of the case main body 10.

In the above Embodiment 1, the curved part 44 is formed in the shape of a perfect circle as seen in a plan view, but the curved part 44 may also be formed so as to have an ellipsoidal shape or the like in a plan view.

Embodiment 2

(Configuration of Battery Case 1x and Safety Valve 4x)

Figure 8:
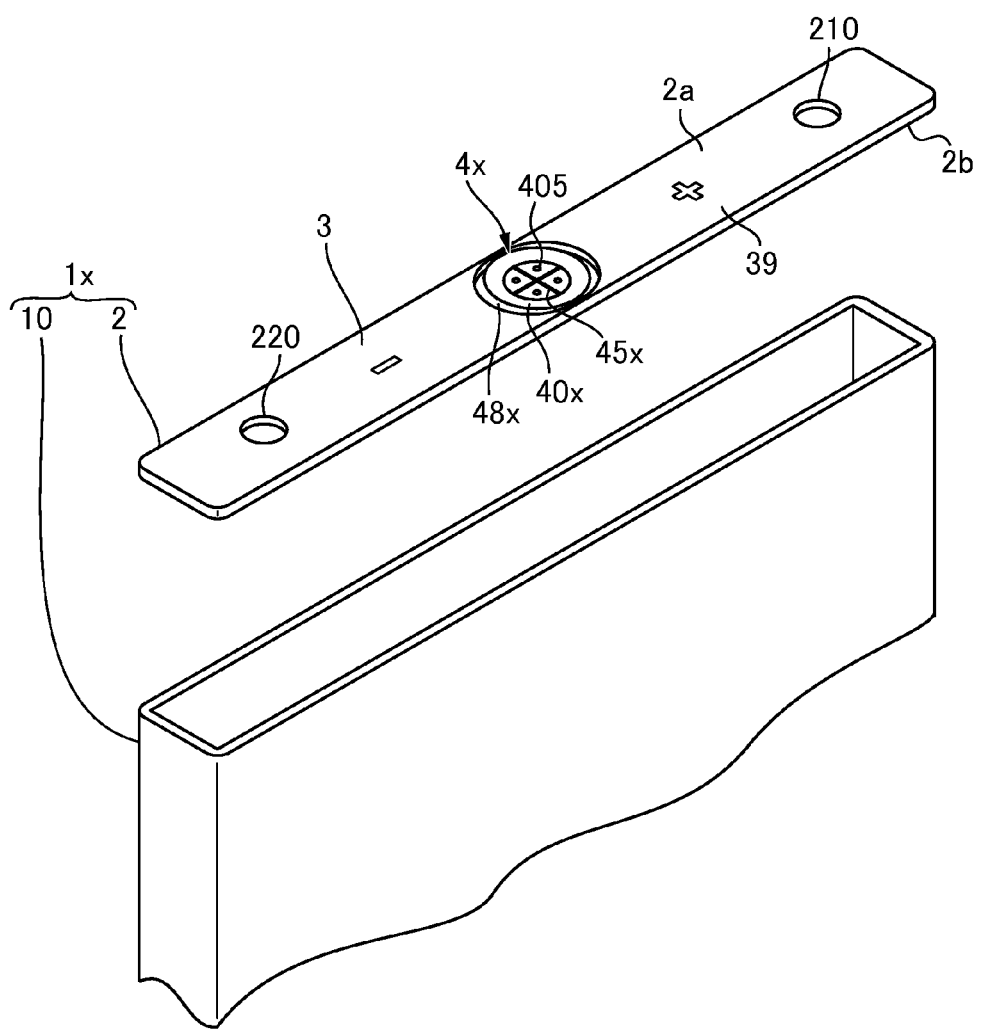
FIG. 8 is an external perspective view of a battery case according to Embodiment 2 of the present invention.
Figure 9:
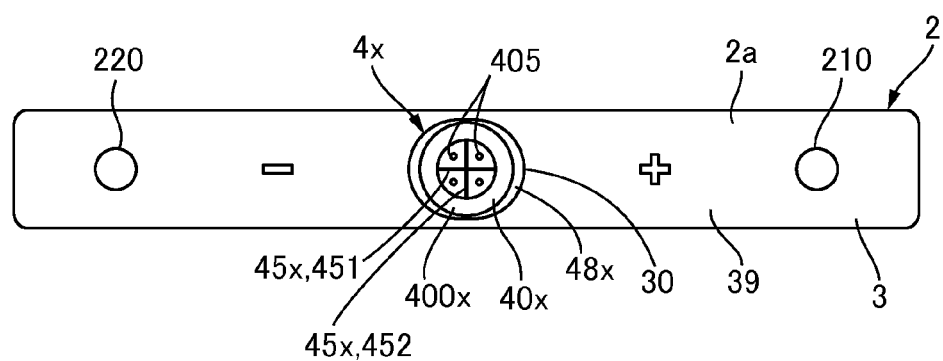
FIG. 9 includes explanatory drawings of the lid of the battery case according to Embodiment 2 of the present invention.
Figure 9:
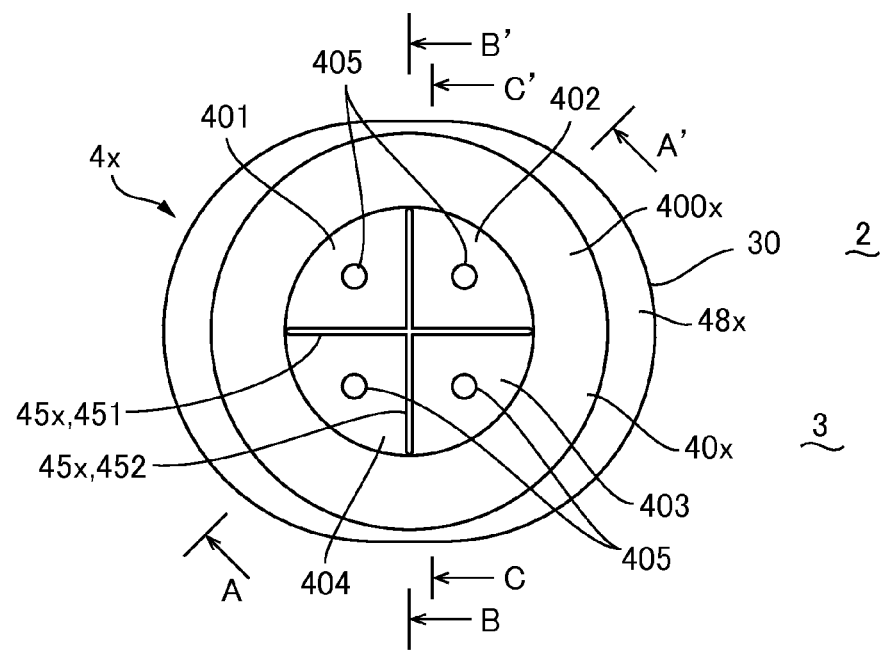
Figure 10:
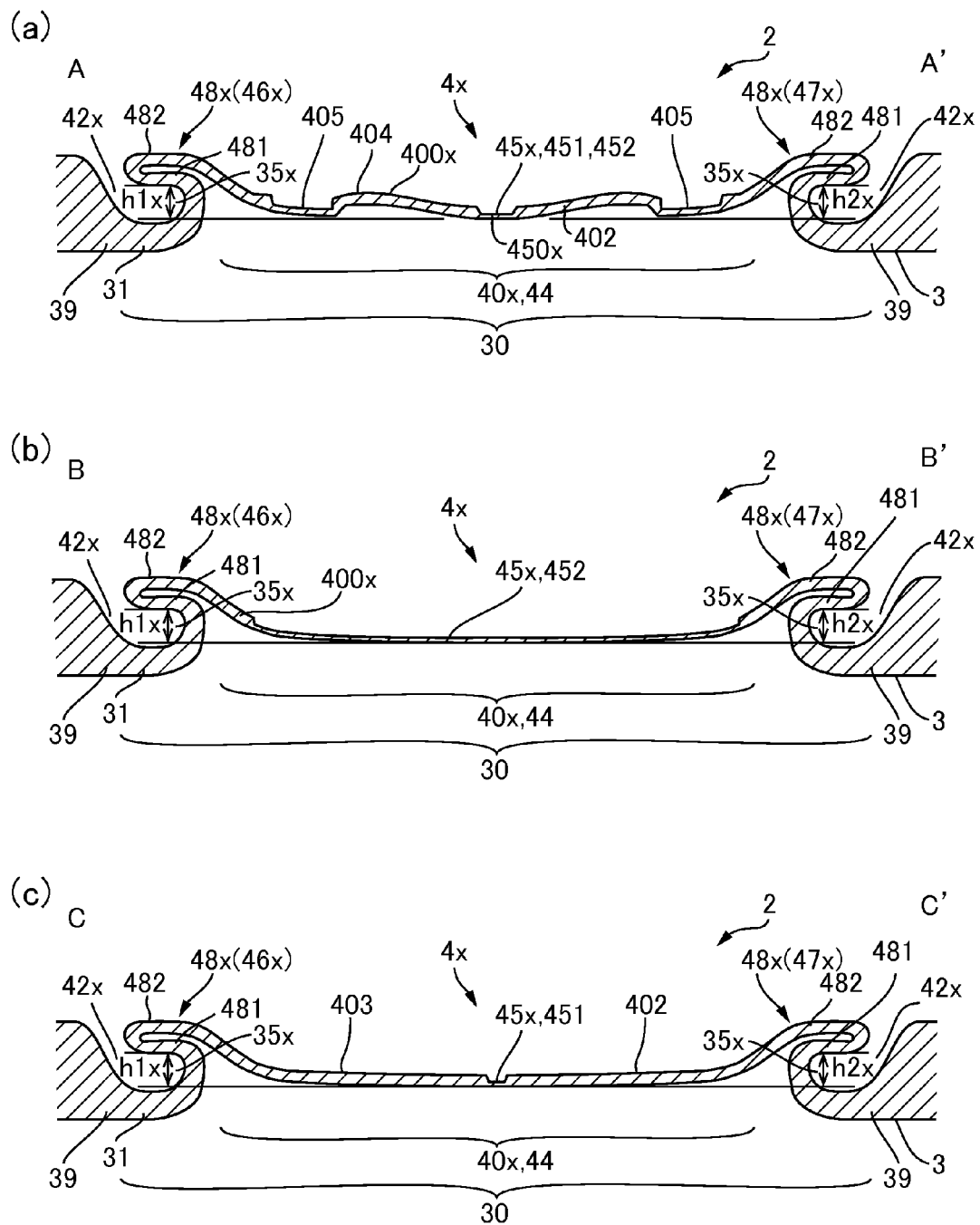
FIG. 10 includes cross-sectional views of a safety valve of the battery case according to Embodiment 2 of the present invention.

FIG. 8 is an external perspective view of a battery case 1x according to Embodiment 2 of the present invention, showing the battery case 1x as being disassembled into a case main body 10 and a lid 2. FIG. 9 includes explanatory drawings of the lid 2 of the battery case 1x according to Embodiment 2 of the present invention, FIGS. 9(a) and (b) being, respectively, a plan view of the lid 2 and an enlarged plan view of the safety valve 4x formed in the lid 2. FIG. 10 includes cross-sectional views of the safety valve 4x of the battery case 1x according to Embodiment 2 of the present invention, FIGS. 10(a), (b), and (c) being, respectively, a cross-sectional view along line A-A' in FIG. 9(b), a cross-sectional view along line B-B', and a cross-sectional view along line C-C'. The battery case 1x of the present embodiment has a basic configuration common with the battery case 1 according to Embodiment 1, and the same symbols are therefore used to denote common portions which are not described.

The battery case 1x according to the present embodiment also has, similar to Embodiment 1, a case main body 10 in the shape of a flat rectangular box and a plate-shaped lid 2 for closing an opening in the case main body 10, as shown in FIG. 8. The lid 2 is secured by laser welding or another method while closing the opening in the case main body 10, whereby the battery case 1x is hermetically sealed, in which state the lid 2 constitutes one surface of the battery case 1x. In the present embodiment, similar to Embodiment 1, the lid 2 has a structure in which the safety valve 4x is formed in a position in the middle of the plate part 3, closing the opening in the case main body 10, by subjecting a metal plate to pressing or another type of machining.

In the lid 2, a thin plate portion 30 obtained by thinning the plate part 3 by pressing is formed in the plate part 3, as shown in FIGS. 9 and 10. Formed in this thin plate portion 30 is a first recessed part 40x in which the thin plate portion 30 is indented inward with respect to the case. A bottom part (bottom plate part 400x) of the first recessed part 40x is a curved part 44 curved toward the inside of the case. In the present embodiment, the thin plate portion 30 is formed as a circular area, and the circular first recessed part 40x is formed concentric with the circular thin plate portion 30 in the inner side of the thin plate portion 30. The area excluding the thin plate portion 30 in the plate part 3 is a flat plate portion 39 thicker than the thin plate portion 30. In the present embodiment, the thin plate portion 30 differs in thickness depending on the regions described hereinafter, but the thickness of the thin plate portion 30 is approximately 0.1 mm to 0.8 mm. The thickness of the bottom plate part 400x of the first recessed part 40x is approximately 0.1 mm to 0.4 mm.

An annular connecting portion 48x, positioned between the first recessed part 40x and the flat plate portion 39 in the plate part 3, encloses the first recessed part 40x with the same configuration throughout the entire circumferential direction. Therefore, the height dimension h1x of a first connecting portion 46x from the bottom plate part 400x of the first recessed part 40x and the height dimension h2x of a second connecting portion 47x from the bottom plate part 400x of the first recessed part 40x are the same, and the ratio of the height dimensions h1x, h2x is set within a range of 0.5:1.0 to 1.0:0.5.

The connecting portion 48x is composed of a folded portion in which the thin plate portion 30 is folded multiple times in the thickness direction of the plate part 3. More specifically, the connecting portion 48x (folded portion) comprises a lower layer portion 481 bent radially outward from the inner edge of the external peripheral portion 31 positioned farthest in the external periphery of the thin plate portion 30 so as to overlap the external peripheral portion 31, and an upper layer portion 482 bent radially inward from the side of the lower layer portion 481 opposite the external peripheral portion 31 so as to overlap the lower layer portion 481, and the bottom plate part 400x of the first recessed part 40x is a continuation of this upper layer portion 482. Therefore, a second recessed part 42x recessed toward the inside of the case is formed in the side of the connecting portion 48x (the first connecting portion 46x and the second connecting portion 47x) opposite the first recessed part 40x, and this second recessed part 42x is equivalent to the external peripheral portion 31 of the thin plate portion 30. The second recessed part 42x also extends annular along the first recessed part 40x, similar to the connecting portion 48x.

In the connecting portion 48x (the first connecting portion 46x and the second connecting portion 47x), the portion overlapping the case-outer-side surface of the plate part 3 is separated from the case-outer-side surface of the plate part 3. Specifically, in the connecting portion 48x, the external peripheral portion 31 and the lower layer portion 481 are separated, and an annular gap 35x is opened between the external peripheral portion 31 and the lower layer portion 481.

In the lid 2 thus configured, a breakage groove 45x constituting the safety valve 4x is formed in the middle or substantially the middle of the bottom plate part 400x of the first recessed part 40x. In the present embodiment, the breakage groove 45x is composed of two grooves 451, 452 intersecting in the middle or substantially the middle of the first recessed part 40x, and these grooves 451, 452 are formed in the case-outer-surface side (the side of a surface 2a) of the bottom plate part 400x of the first recessed part 40x. In the present embodiment, the two grooves 451, 452 are orthogonal. The breakage groove 45x has a trapezoidal or substantially V-shaped cross section, and a groove bottom part 450x is set with a predetermined thickness according to the set breakage load. If the cross section of the breakage groove 45x is trapezoidal, the thickness in the groove bottom part 450x can be measured. In the present embodiment, the thickness of the groove bottom part 450x is approximately 0.03 mm to 0.08 mm. As is described hereinafter, the breakage groove 45x is cleaved when the internal pressure of the battery case 1x has risen excessively, and the breakage groove functions as a safety valve 4x for releasing the internal pressure out of the battery case 1x.

In the present embodiment, circular recessed parts 405, intended inward with respect to the case, are formed by pressing in the middle of each of four areas 401, 402, 403, 404 divided by the two grooves 451, 452 in the case-outer-surface side (the side of the surface 2a) of the bottom plate part 400x of the first recessed part 40x.

The lid 2 of this configuration can be manufactured by performing pressing for forming the recessed parts 405 in addition to the stretch forming step, groove part forming step, and other steps described with reference to FIG. 6, and the pressing can be performed either independently or simultaneously with the other steps.

(Function of Safety Valve 4x Etc.)

Figure 11:
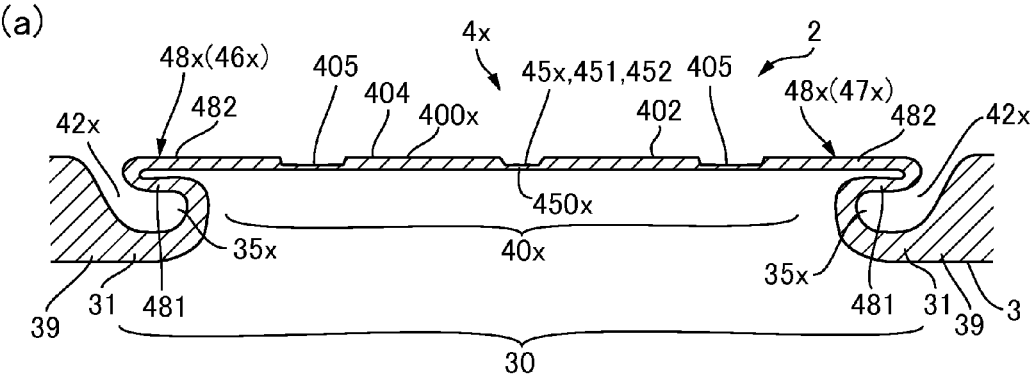
FIG. 11 includes explanatory drawings showing the change in the shape of the safety valve accompanying a rise in internal pressure in the battery case according to Embodiment 2 of the present invention.
Figure 11:
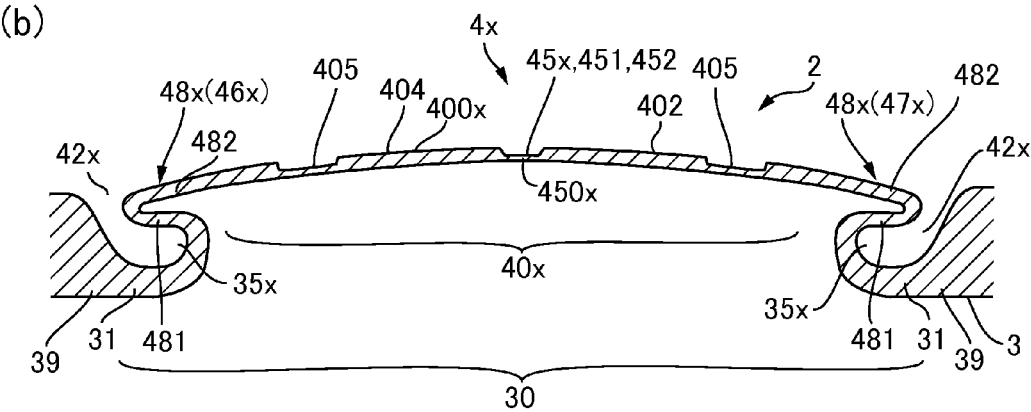

FIG. 11 includes explanatory drawings showing the change in the shape of the safety valve 4x accompanying an increase in internal pressure in the battery case 1x according to Embodiment 2 of the present invention, FIGS. 11(a) and (b) being, respectively, an explanatory drawing of the safety valve 4x when the internal pressure has risen, and an explanatory drawing of the safety valve 4x when the internal pressure has risen further.

In a secondary battery using the battery case 1x of the present embodiment, the internal pressure fluctuates along with repeated charging and discharging. More specifically, in a secondary battery, because heat is generated during charging, the temperature of the secondary battery rises and the internal pressure rises, and because heat is not generated during discharge, the temperature of the secondary battery falls and the internal pressure falls. The internal pressure sometimes also fluctuates along with changes in the environmental temperature.

When there has been such an increase in internal pressure, the lid 2 deforms so that the entire thin plate portion 30 is displaced toward the outside of the case and the bottom plate part 400x of the first recessed part 40x deforms toward the outside of the case, as in the change from the state shown in FIG. 10 to the state shown in FIG. 11(a). The folded portion constituting the connecting portion 48x also deforms at this time. When charging stops and the internal pressure falls, the lid 2 returns from the state shown in FIG. 11(a) to the state shown in FIG. 10, such that the entire thin plate portion 30 is displaced toward the inside of the case and the bottom part of the first recessed part 40x also deforms toward the inside of the case.

When the internal pressure rises, the entire thin plate portion 30 of the lid 2 is displaced toward the outside of the case as in the states shown in FIGS. 10 to 11(a), and when the internal pressure further rises after the bottom plate part 400x of the first recessed part 40x has deformed toward the outside of the case, the lid 2 deforms so that the entire thin plate portion 30 is further displaced toward the outside of the case and the bottom plate part 400x of the first recessed part 40x bulges toward the outside of the case, as in the states shown in FIGS. 11(a) to 11(b). The folded portion constituting the connecting portion 48x also deforms. At the point in time that the internal pressure exceeds a set value, the breakage groove 45x cleaves. Therefore, internal pressure can be released out of the battery case 1x. In the present embodiment, the thickness and other features of the groove bottom part 450x are set so that the breakage groove 45x cleaves at the point in time that the internal pressure exceeds 1.1 MPa (the set value).

(Main Effect of the Present Embodiment)

As described above, in the lid 2 of the battery case 1x of the present embodiment, the first recessed part 40x is formed in which the plate part 3 is indented inward, with respect to the case, in a curved shape, and the breakage groove 45x for the safety valve 4x is formed in the middle or substantially the middle of the bottom plate part 400x of the first recessed part 40x. Therefore, even when the internal pressure fluctuates along with repeated charging and discharging or the like, the incurred change in internal pressure is absorbed by the bottom plate part 400x of the first recessed part 40x deforming outward or inward with respect to the case. Therefore, the breakage groove 45x is not subjected to excessive compressive stress or excessive tensile stress, and the breakage groove 45x does not readily wear out. Therefore, the breakage groove 45x does not cleave except for when the internal pressure reaches a level that exceeds normal rises in pressure, such as those during charging and rises in the environmental temperature. The working pressure of the safety valve 4x can therefore be stabilized.

Because the breakage groove 45x is formed in the middle or substantially the middle of the readily deforming bottom plate part 400x of the first recessed part 40x, when the bottom plate part 400x bulges toward the outside of the case, compressive stress first acts on the breakage groove 45x, after which tensile stress acts and the breakage groove 45x cleaves. Therefore, the breakage groove 45x reliably cleaves even if the groove bottom part 450x is thick to a certain extent. Therefore, it is rare that the breakage groove 45x cleaves while the secondary battery is being assembled because the strength of the breakage groove 45x can be increased. The battery case 1x is therefore easily handled. Because of a configuration in which two stages of pressure are incurred, which are the deformation of the bottom plate part 400x of the first recessed part 40x and the cleaving of the breakage groove 45x, there are many parameters for setting the working pressure, such as the thickness and shape of the groove bottom part 450x of the breakage groove 45x, and the shape of the bottom plate part 400x of the first recessed part 40x, and the working pressure can therefore be set to any desired level.

In the present embodiment, because the thin plate portion 30 is formed in the plate part 3 constituting the lid 2 and the safety valve 4x is provided in the thin plate portion 30, the safety valve 4x does not protrude toward the outside of the case any more than is necessary. This gives the advantage of little risk of damaging the safety valve 4x during work such as attaching the lid 2. In the present invention, because the connecting portion 48x (the first connecting portion 46x and the second connecting portion 47x) is in a position of protruding toward the outside of the case from the plate part 3, the same effects as Embodiment 1 are achieved, such as the structure being such that the bottom plate part 400x of the first recessed part 40x either does not protrude from the case-inner-side surface of the plate part 3 or protrudes only slightly, even when the first recessed part 40x indented inward with respect to the case is formed.

Furthermore, in the present embodiment, the first recessed part 40x is formed into a circle, and the breakage groove 45x is composed of two grooves 451, 452 that intersect in the middle or substantially the middle of the bottom plate part 400x of the first recessed part 40x. Therefore, the breakage groove 45x reliably cleaves when the internal pressure reaches a level that exceeds normal rises in pressure, such as those during charging and rises in the environmental temperature.

Because the two grooves 451, 452 intersect at right angles, the four portions 401, 402, 403, 404 have the same strength, being partitioned by the two grooves 451, 452 of the bottom plate part 400x of the first recessed part 40x. Therefore, the four portions 401, 402, 403, 404 deform simultaneously when the internal pressure rises, and the breakage groove 45x does not cleave unexpectedly. Furthermore, the recessed parts 405 are formed in the four portions 401, 402, 403, 404, and the recessed parts 405 strengthen the four portions 401, 402, 403, 404. Therefore, the breakage groove 45x does not cleave unexpectedly because the four portions 401, 402, 403, 404 have sufficient strength.

(Modifications of Embodiment 2)

In the above Embodiment 2, the bottom plate part 400x of the first recessed part 40x slightly curves toward the inside of the case, but a configuration in which the bottom plate part 400x of the first recessed part 40x is flat may also be employed.

In the above Embodiment 2, the safety valve 4x is formed in the lid 2 of the battery case 1x, but a safety valve may also be formed in the side of the case main body 10.

In the above Embodiment 2, the first recessed part 40x is formed in the shape of a perfect circle as seen in a plan view, but the first recessed part 40x may also be formed so as to have an ellipsoidal shape or the like in a plan view.

INDUSTRIAL APPLICABILITY

In the battery case according to the present invention, the breakage groove is not subjected to excessive compressive stress or excessive tensile stress even when internal pressure fluctuates along with repeated charging and discharging or the like, and the breakage groove therefore does not wear out readily. Therefore, the breakage groove does not cleave except for when the internal pressure reaches a level that exceeds normal rises in pressure, such as those during charging and rises in the environmental temperature. The working pressure of the safety valve can therefore be stabilized. When the first recessed part bulges toward the outside of the case, compressive stress first acts on the breakage groove, after which tensile stress acts and the breakage groove cleaves. Therefore, the breakage groove reliably cleaves even if the groove bottom part is of a certain degree of thickness. Therefore, it is rare that the breakage groove cleaves while the secondary battery is being assembled because the strength of the breakage groove can be increased. The battery case is therefore easily handled. In the present invention, because of a configuration in which two stages of pressure are incurred; i.e., are the deformation of the first recessed part and the cleaving of the breakage groove, there are many parameters for setting the working pressure, such as the thickness and shape of the groove bottom part of the breakage groove and the shape of the first recessed part, and the working pressure can therefore be set to any desired level.

The invention claimed is:

1. A battery case in which a breakage groove for a safety valve is formed in a plate part constituting any surface of a case formed by machining a metal plate, the battery case comprising:
   a first recessed part, which is indented inward with respect to the case and is formed in the plate part, and
   wherein the breakage groove is formed in a middle or substantially the middle of a bottom part of the first recessed part,
   a first connecting portion and a second connecting portion connect to the first recessed part on both sides flanking the first recessed part in the plate part,
   at least one of the first connecting portion and the second connecting portion is constituted by a folded portion in which the plate part is folded multiple times in a thickness direction thereof, and a portion in the folded portion that overlaps a case-outer-side surface of the plate part is set apart by a gap from the case-outer-side surface of the plate part.

2. The battery case according to claim 1, wherein in the first connecting portion and the second connecting portion that connect to the first recessed part on both sides flanking the first recessed part in the plate part, a ratio between a height dimension of the first connecting portion from a bottom part of the first recessed part and a height dimension of the second connecting portion from the bottom part of the first recessed part is within a range from 0.5:1.0 to 1.0:0.5.

3. The battery case according to claim 1, wherein a second recessed part, recessed inward with respect to the case, is formed in a side of the first connecting portion opposite the first recessed part, and/or in a side of the second connecting portion opposite the first recessed part.

4. The battery case according to claim 1, wherein the breakage groove is formed in a case-outer-side surface of the bottom part of the first recessed part.

5. The battery case according to claim 1, wherein the bottom part of the first recessed part has a flat surface part, and
the breakage groove is formed in the flat surface part.

6. The battery case according to claim 1, wherein
the first recessed part extends as a groove in the plate part, and
the breakage groove extends along an extending direction of the first recessed part.

7. The battery case according to claim 6, wherein the first recessed part is formed in a circumferentially continuous annular shape.

8. The battery case according to claim 6, wherein the breakage groove extends circumferentially along the first recessed part with at least one noncontinuous portion.

9. The battery case according to claim 1, wherein
the first recessed part is formed as a circle in the plate part, and
the breakage groove comprises two grooves intersecting in the middle or substantially the middle of the bottom part of the first recessed part.

10. The battery case according to claim 9, wherein the two grooves intersect at right angles.

11. The battery case according to claim 9, wherein, in the bottom part of the first recessed part, reinforcing recessed parts are formed in four portions partitioned by the two grooves.

* * * * *